United States Patent [19]

Charlebois

[11] Patent Number: 4,581,480
[45] Date of Patent: Apr. 8, 1986

[54] CABLE SPLICE CLOSURE AND STRAIN RELIEF

[75] Inventor: Leonard J. Charlebois, Kanata, Canada

[73] Assignee: Northern Telecom Limited, Montreal, Canada

[21] Appl. No.: 648,461

[22] Filed: Sep. 7, 1984

[51] Int. Cl.$^4$ .................. H02G 15/07; H02G 15/013; H02G 15/113
[52] U.S. Cl. .................................... 174/84 R; 156/49; 174/92; 174/93
[58] Field of Search ...................... 174/76, 84 R, 88 R, 174/91, 92, 93, 21 R; 156/49, 56

[56] References Cited

U.S. PATENT DOCUMENTS

| | | | |
|---|---|---|---|
| 3,122,597 | 2/1964 | Lemieux | 174/84 R |
| 3,159,251 | 12/1964 | Becker | 52/287 X |
| 3,240,868 | 3/1966 | Ets-Hokin et al. | 174/88 R |
| 3,564,116 | 2/1971 | Masterson et al. | 174/88 R |
| 3,798,347 | 3/1974 | Harding et al. | 174/84 C |
| 3,970,488 | 7/1976 | Nelson | 156/49 |
| 4,266,992 | 5/1981 | Agaisse | 174/88 R X |
| 4,322,573 | 3/1982 | Charlebois | 174/88 R X |
| 4,341,922 | 7/1982 | Bossard et al. | 174/92 |

FOREIGN PATENT DOCUMENTS

| | | | |
|---|---|---|---|
| 1911213 | 9/1970 | Fed. Rep. of Germany | 174/88 R |
| 2158992 | 5/1973 | Fed. Rep. of Germany | 174/92 |
| 1435560 | 5/1976 | United Kingdom | 174/93 |

OTHER PUBLICATIONS

Yashiro, Takamasa et al; Thermal Characteristics of Aerial Cables with Plastic Sheath; papers for the Society of Electronic Communications; pp. 215–222; 1983/2; vol. J66-B No. 2.

Primary Examiner—A. T. Grimley
Assistant Examiner—Morris H. Nimmo
Attorney, Agent, or Firm—R. J. Austin

[57] ABSTRACT

Cable splice and closure arrangement to cover a cable region which is devoid of sheath and jacket. At each side of the devoid region, the cable has a strap member encircling it and piercing means of the strap member protrude through the jacket and into the sheath at spaced positions around the cable. An outwardly projecting means of each strap member is intimately embedded in a moulded plastic end of a combined closure and tensile strength means. This combined means may be an integral moulding having the two ends and a portion between the ends and which bridges the devoid region. Alternatively, it may comprise individual moulded plastic ends with tensile means such as steel rods extending between the embedded in the ends. The invention also includes a strain relief device for inclusion in the splice and closure arrangement.

11 Claims, 9 Drawing Figures

CABLE SPLICE CLOSURE AND STRAIN RELIEF

This invention relates to cable splice closure and strain relief.

Aerial telecommunications cable is connected to customers' premises by drop wires, the conductors of which are spliced to conductors of the cable. To provide access to the conductors of the cable, it is essential to cut into and remove sections of the cable jacket and the metallic sheath lying beneath the jacket and surrounding the cable core. After conductors of drop wires have been spliced to the chosen conductors of the cable, it is preferable to fluid-tightly seal each splice to prevent deterioration of the connections between the conductors by contact with ambient moisture. Various forms of closure are used for this purpose. Another aspect of concern exists because of the removal of the sections of the cable jacket and sheath. Some means must be provided to ensure that the two parts of the cable at each side of the region devoid of jacket and sheath are not pulled away from each other under the weight of the aerial cable. In known strain relief constructions, a bond clamp has been used which is formed from metal and bridges the devoid region to be secured at each side to the sheath for tne intention of taking any tensile load which exists in the cable. The closure then covers the area of the spliced conductors, the devoid region and the bond clamp.

A problem with existing strain relief methods is that the bond clamp has been found, on many occasions, to be insufficiently strong or its connection to the metallic sheath has had a weakness such as to allow the weight of the cable at each side of the devoid region to pull the cable apart and remove it from the closure, thereby breaking splices or exposing them to the deteriorating effects of the atmosphere. From tests which have been performed, it has been found that the existing bond clamp system provides sufficient strength to prevent aerial cable pull-outs from splice closures of up to less than 400 pounds tensile force. These strengths have been inadequate in many instances. Axial forces on cable have been discussed in detail in "Paper of the Society for Electronic Communications" in Japan, namely in a paper entitled "Thermal Characteristics of Aerial Cables with Plastic Sheath" by T. Yashiro, H. Fukutomi and H. Yamaguchi on pages 215-222, Vol. J66-B No. 2 of the Papers.

Similar problems exist in situations where two aerial cables are joined together with conductors of each cable connected to those of the other. In these situations, there is no continuity in the sheath and jacket from one cable to the other.

The present invention provides a cable closure in which jacket and metallic sheath materials have been removed and wherein a strain relief device is included of greater tensile strength than has been provided previously, whereby the chances of a cable pulling away from the enclosure are significantly reduced. The invention also includes a strain relief device for such a cable closure.

Accordingly, the present invention provides a strain relief device comprising a strap member for securing a cable to a plastic encapsulation, the strap member comprising a flexible base, having a certain width laterally of the strap length, piercing means extending from the base in one direction for piercing into a cable and projecting means extending from the base in the other direction.

The projecting means preferably comprises a plurality of flanges which allow for flexing of the base to allow the device to be wrapped around a cable. Preferably, the flanges are provided along at least one edge of the base. Upon the base being bent, i.e. during wrapping around a cable, the flanges are moved apart by the widening of a space between them.

The present invention further comprises a cable splice and closure arrangement in which conductors span a region between two cable sections, said region being devoid of a cable jacket and metallic sheath, the arrangement provided with a combined closure and tensile strength means and with two strain relief devices, one encircling each cable section, each strain relief device comprising a strap member having a flexible base which is wrapped and tightened around its cable section, the base having radially inwardly extending piercing means which protrude through the jacket and into the sheath at circumferentially spaced positions around the cable, and the base also having radially outward projecting means, and wherein the combined closure and tensile strength means includes moulded plastic ends which intimately surround end portions of the cable sections with the projecting means intimately embedded in the plastic ends to transfer tensile load from the cable sections into the plastic ends, the combined means also enclosing spliced together conductors in the arrangement and bridging the region between the sections to carry tensile load from one plastic end to the other.

Preferably the plastic ends are moulded integrally with a moulded plastics axially extending part of the encapsulation which bridges the region between the sections. Alternatively, the combined means includes a plurality of tensile strength members which are spaced apart circumferentially of the arrangement and extend axially to be connected to the plastic ends to prevent them from being forced apart. The strength members may be steel or other metal rods or bars. In this latter construction, a shrouding means needs to extend between the plastic ends so as to surround the devoid region. This shrouding means is conveniently a flexible sheet which is wrapped around the devoid region to form a sleeve and is sealingly mounted around the plastic ends. Meeting side edges of the sheet are also sealed together.

The alternative structure discussed above is particularly useful for gas pressurised aerial cable.

A seal is advantageously provided around each cable section and is enclosed by the associated moulded plastic end. This seal may be of a construction such as is described in U.S. patent application Ser. No. 648,460 filed Sept. 7, 1984 and entitled "Sealing Closure For a Cable Splice", in the names of L. J. Charlebois and K. H. Dick. This seal is effective when it is required to mould the plastic ends around the cables at temperatures below the softening point of the cable jackets so that a seal cannot be provided by the flowing and fusing together of the materials of the jackets and the ends.

The invention also includes a method of making a cable splice and closure arrangement comprising providing two sections of cables, both having a jacket and sheath, the sections spaced by a cable region which is devoid of a cable jacket and metallic sheath and with conductors extending from at least one of the sections spliced to other conductors; locating a strain relief device in the form of a strap member around each cable section with piercing means of the device protruding through the cable jacket and into the sheath, and with projecting means extending outwardly from the jacket; and then providing a combined splice closure and tensile strength means by moulding plastic ends of the means, with one plastic end surrounding and in intimate engagement with each cable section to intimately embed the projecting means in the plastic end, and bridging between the plastic ends to enclose spliced together conductors in the arrangement and to carry tensile loads from one plastic end to the other.

Embodiments of the invention will now be described, by way of example, with reference to the accompanying drawings in which.

Figure 1:
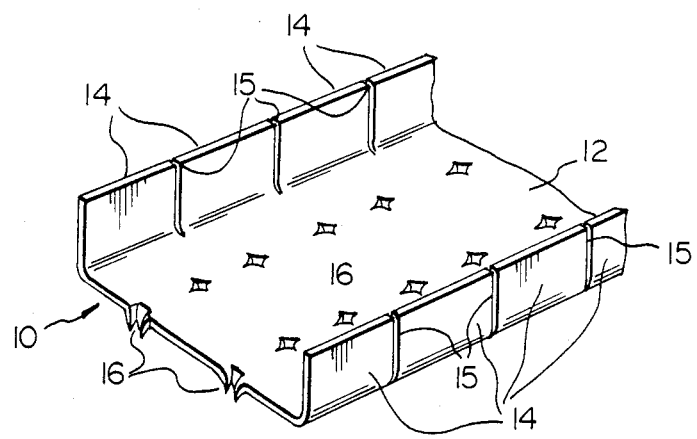
FIG. 1 is an isometric view, on a large scale, of a strain relief device for incorporation into a cable splice and closure arrangement.

As shown by FIG. 1, there is provided a strain relief device for use in a cable splice and closure arrangement. The strain relief device comprises a strap member 10 which has a base region 12 with upstanding edge flanges 14 which project from the base region in the same direction as shown. The flanges are separated by slits 15. Piercing means to pierce a jacket and cable sheath project from the opposite side of the base region 12. These piercing means 16 are in two parallel rows of downwardly projecting prongs with the piercing means staggered from one row to another as shown. The piercing means 16 are in clusters of four prongs at each position, the four prongs having been formed by a cruciform slit in the base with the edges of the slit turned downwardly.

Figure 3:
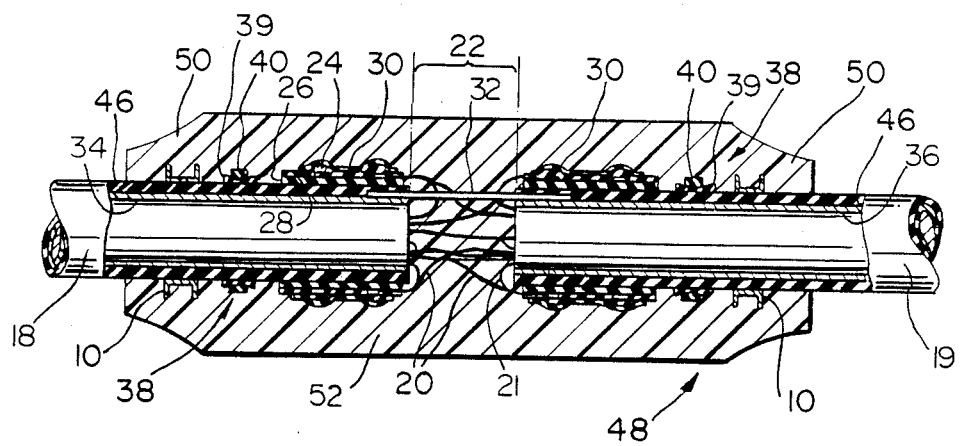
FIG. 3 is a cross-sectional view through an arrangement according to a first embodiment and on a smaller scale.

FIG. 3 shows a cable splice and closure arrangement according to a first embodiment. As shown, two cable ends 18 and 19 have had end portions of their jackets and sheaths removed to expose lengths of conductor 20 and 21. The cables are located axially in line and with their jackets and sheaths spaced by about 30 centimeters to produce a region 22 which is devoid of cable jacket and sheath. To join the cables, each conductor of one cable is electrically connected with a conductor of the other cable to form a splice 24. Conveniently, each splice 24 is located upon an end portion of the jacket of one of the cables and is individually sealed from other splices by wrappings 26 and 28 of sealing tape under and over the splices. The sealing tape may be ethylenepropylene rubber tape or other heat softenable material. This structure with the splices arranged upon the jacket end portions is discussed more fully in a copending U.S. patent application Ser. No. 560,542, filed Dec. 12, 1983, in the names of L. J. Charlebois and R. R. D'Aoust entitled "Forming Cable Splice Closures". A surrounding layer 30 of vinyl tape is wrapped around layers 26 and 28 to prevent their displacement during heat softening which is to follow. The layers 26 and 28 have portions extending axially beyond each side of the layer 30. Prior to the location of the splices upon the jackets, a ground connection 32 of conventional construction and with minimal tensile strength extends beneath the jackets to electrically connect the two sheaths 34 and 36 of the cables.

A seal 38 is disposed around each cable section and axially outwards of the wrappings 26, 28 and 30 for providing a seal between the jacket of each cable section and a splice encapsulation forming a closure, as will be described. Each seal 38 is of a construction decribed in U.S. patent application Ser. No. 648,460, filed Sept. 7, 1984, and entitled, "Sealing Closure For a Cable Splice" in the names of L. J. Charlebois and K. H. Dick. As described in the latter specification, the seal 38 comprises an inner wrapping layer 39 of a material which is deformable so that under compression it will intimately engage the surface of the jacket so as to form a first seal to prevent moisture ingress along the jacket surface towards the splices and the region 22. Such a material for the inner layer is an ethylene-propylene rubber. An outer layer 40, which is wrapped around it, needs to be a resilient tape material which is stretched very tightly so as to provide the required compressive force upon the layer 39. This material should not become molten or softened during the moulding of an encapsulation, to be described, so that the resilient nature of the outer layer 40 is maintained after manufacture. A suitable material for layer 40 is neoprene rubber tape which is stretched extremely tightly around the layer 39, a tape referred to throughout the telecommunications cable industry as "DR Tape", or any other suitable elastic polymeric material. A further feature of the material of the inner layer is that it should be compatible with the material used for moulding the encapsulation so as to be softened by it during moulding and to fuse with it at an interfacial region between the encapsulation and the layer to form a second seal. Such an interfacial region occurs at axial ends of each layer 39 which project beyond the layer 40, as shown. Thus, a seal is formed on each axial side of layer 40 to prevent the ingress of moisture.

Figure 2:
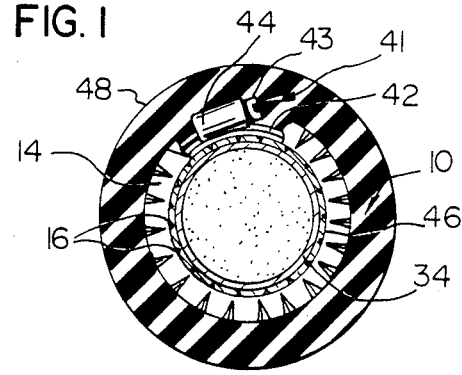
FIG. 2 is a cross-sectional view through a cable showing the strain relief device assembled in position.

Each strap member 10 is then wrapped around its cable jacket, as shown in FIGS. 2 and 3, in a position axially outwardly from its associated seal 38. Wrapping takes place by flexing the base of each strap member so as to encircle the jacket. Flexure is permitted by the slits 15 between flanges 14 so that the flanges move apart by opening of the slits and project outwardly from the cable jacket, as shown by FIG. 2. To clamp the strap member in position, a gear clamp fastening 41 of known construction is used. The gear clamp, commonly known as a "circlip", has a strap 42 which is formed in one surface with slots (not shown) to accept the thread of a screw 43 held rotatable but otherwise captive within a retaining housing 44 situated at one end of the strap 42. The strap 42 is wrapped around the base of the strap member 10 and with one end of the strap 42 engaged beneath the screw 43 in known manner, the screw is turned to draw the strap past the screw so as to form an annulus of progressively decreasing radius. This action places an inwards compression upon the base of the strap member to push it inwardly onto the jacket to cause the piercing prongs 16 to pierce and protrude through the jacket 46 and then into the metallic sheath 34 or 36 of the cable. This is the position of the tightened strap member as shown by FIG. 2.

A combined closure and tensile strength means is then provided for the completion of the splice and closure arrangement. This combined means is a moulded encapsulation 48 (FIG. 2) which intimately surround end portions of the cables 18 and 19. The encapsulation also includes a moulded axially extending part 52 of the encapsulation, which is integrally moulded with the plastic ends and encapsulates the splices and wrappings 26, 28 and 30 and seals 38 while having sufficient tensile strength to carry tensile loads from one plastic end to the other. The encapsulation may be formed from any suitable mouldable material, e.g. a mouldable acrylic acid, ionized resins, a polyethylene, or ethylene vinyl acetate. Examples of these materials are ethylene acrylic acid sold by Dow Chemical of Canada Limited under their product numbers 459, 455 and 435, ionized resins sold by Dupont of Canada Limited under their trade names "Surlyn" 1652, and "Surlyn" 1702, and ethylene vinyl acetate sold by Dupont of Canada Limited under their product number 3180. In this particular case, where it is desirable to form a seal between the encapsulation and portions of the tape layers 26 and 28 projecting beyond the tape 30, and between the encapsulation and the inner layers 39 projecting beyond the layers 40 of seals 38, it is preferable to use polyethylene as the mouldable material. A low density polyethylene, e.g. as sold by Dupont under their grade reference 2114, is suitable for this purpose.

Figure 4:
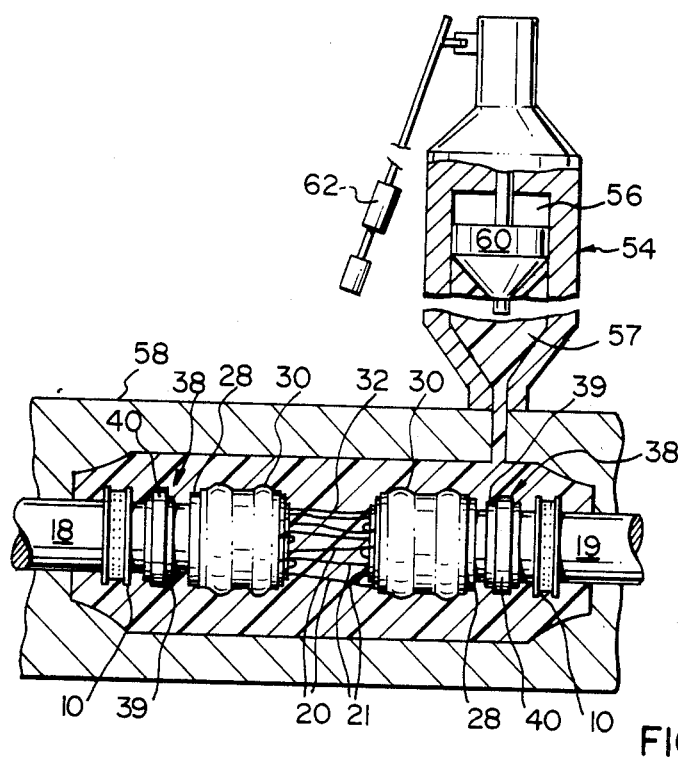
FIG. 4 is a side elevational view of the arrangement according to the first embodiment during moulding of a closure and with one mould half removed.

The encapsulation is conveniently moulded in the field by the equipment shown in FIG. 4. The moulding method in the field is generally as described in copending U.S. patent application Ser. No. 527,759, filed Aug. 30, 1983 in the names of L. J. Charlebois, R. Mariani and F. A. Huszarik entitled "Methods and Apparatus for Sealing Articles". As described in that application, the encapsulation is moulded by the use of an accumulator 54 having a chamber 56 filled with the molten encapsulating material 57. As described in U.S. patent application Ser. No. 527,759, the molten encapsulating material is extruded into the accumulator chamber from an extruder (not shown) which has an extruder rate slower than the rate of expelling the molten material from the accumulator 54. Hence, the accumulator may be used to fill a mould cavity of an aluminum mould 58 to form the encapsulation at a rate sufficiently fast to ensure that no part of the moulded encapsulation is solidifying before the moulding process is completed. As shown by FIG. 4, the accumulator has a piston 60 which is operable by a handle 62, as described in U.S. patent application Ser. No. 527,759 for the purpose of expelling the molten material from the accumulator. The accumulator is provided with heat insulating and/or heating means for ensuring that the material within the chamber is maintained in a molten condition, i.e. at around 204° C., until required for the moulding operation.

To mould the encapsulation, the accumulator 54 is coupled to the mould, one mould half of which only is shown, and the cavity is filled with the molten polyethylene material. The normal mould temperature controlled by cooling water is around 20° C. During moulding and cooling of the encapsulating material and starting with a maximum molten temperature of 204° C., the heat dissipates through the aluminum mould sufficiently quickly to prevent softening of the jacket material and fusing of the jacket material to the encapsulation. However, there is sufficient heat retention over a sufficiently long period to soften the layers 26 and 28 of tape material and bond these into a solid single mass of material so as to encapsulate each of the splices 24. This single mass of material hardens during cooling to thoroughly seal each of the splices. The cooling effect of the encapsulation applies a compressive force upon the ethylene/propylene material of the tapes through the vinyl so that the material shrinks to lie intimately in contact with the splice surfaces. This is the method of sealing the splices effectively from ambient atmospheric conditions which is described in the copending U.S. patent application Ser. No. 560,542 entitled "Forming Cable Splice Closures", as referred to above.

In addition, during moulding of the encapsulation, the axially projecting ends of each layer 39 soften and fuse to the encapsulation to form one fluid-tight seal. Another fluid-tight seal is formed by the compression of the layer 39 by layer 40 onto the jacket surface. These two sealing actions are as described in U.S. patent application Ser. No. 648,460, filed Sept. 7, 1984 and entitled "Sealing Closure For A Cable Splice", as referred to above.

Also, during the forming of the encapsulation, the plastic ends 50 which are moulded integrally therewith lie in intimate surrounding engagement with each cable section 18 and 19 to intimately embed the flanges 14 of the strap members 10 in the plastic.

With the completed encapsulated splice arrangement in position in an aerial cable extending between spaced supports, it is found that the encapsulation and strap member combination is capable of withstanding tensile loads which operate in the direction to pull the cable ends outwardly from the encapsulation, to a greater extent than is possible with conventional constructions. Any tensile loads taken in the cable, such as would occur because of its own weight when in an aerial position, are transmitted from each metallic sheath into the strap member by means of the prongs 16 projecting into the sheath, and then through the strap member and into each plastic end 50. The tensile loads are then taken from each plastic end through the axially extending part 52 of the encapsulation which has an outer diameter of about 2 inches on a cable diameter of 1 inch.

Tests were performed to show the tensile strength of the arrangement of the first embodiment and to compare it with that of other structures.

Figure 5:
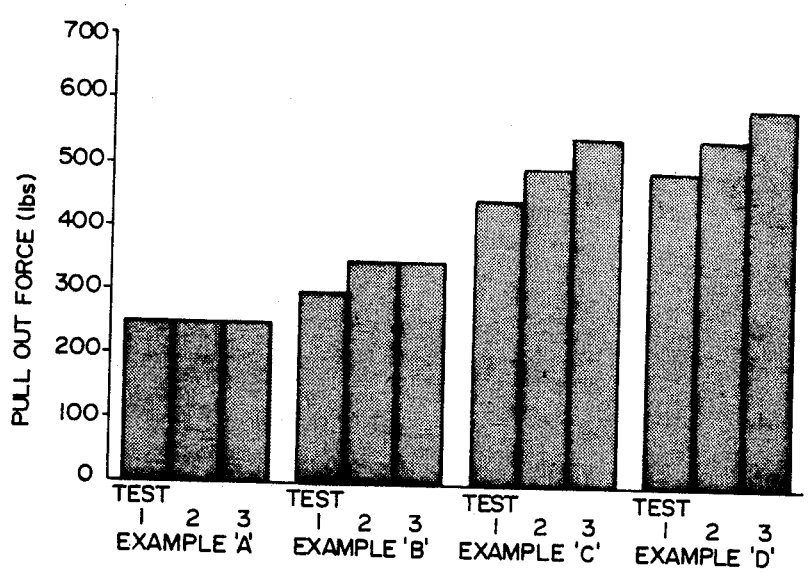
FIG. 5 is a graph showing tensile test results to compare the structure of the first embodiment and other structures.

As shown by FIG. 5, these tests involved constructions of splice and encapsulation arrangements. In each arrangement, the splices for the conductors were formed in the manner described in the embodiment, by locating the splices upon the cable jacket and surrounding them with layers 26, 28 and 30 of the wrapping tape. The encapsulation was then provided in the manner described to produce an integral encapsulation as described in the embodiment. In the four examples tested, the results of example "A" are test results produced upon the structure as described in the first embodiment, but without use of a conventional bond bar for joining the cable sheaths and also without incorporating the strap members 10. Three tests were performed upon example A and it was found that in each test, one of the cable end sections pulled away from the encapsulation when a continuous load of approximately 250 pounds had been applied to the ends of the cable.

In example "B", a bond bar was incorporated into the structure, the bond bar being in the position of the ground bar 32 described in the embodiment but having more substantial structure according to conventional design for the purpose of taking a tensile pull from one conductor to another. It was found with three tests performed upon example B that the bond bar failed and one cable section pulled away from the encapsulation under continuous tensile loads between 300 and 360 pounds.

Example "C" is the structure described in the first embodiment and differed from example "B" in that the bond bar of example "B" was replaced by the ground wire 32, as described, and the strap members 10 were incorporated as shown. As can be seen, with the structure of the first embodiment during three tests with the application of continuous pulling load, one of the examples failed under a load of approximately 450 pounds, while the other two encapsulations failed under loads of approximately 500 and 550 pounds.

In a further example "D", a structure as described in the first embodiment was tested, this structure differing from the embodiment in that the ground wire 32 was replaced by the stronger conventional bond bar. As may be seen from the results, in example "D", the loads at which failure took place were between 500 and 600 pounds.

As can be seen from the results in FIG. 5, the invention so far as is exemplified by the first embodiment, is capable of withstanding far greater pulling loads than the conventional structure shown in the test results upon example "B". The results in example "C" are satisfactory in that the structure of the first embodiment is capable of sustaining a normal continuous pulling load, such as would be expected with a cable in the aerial position with substantially no failures. This is in contrast to the conventional construction of example "B" in which failures occur regularly, are expensive to repair and are inconvenient to consumers.

Figure 6:
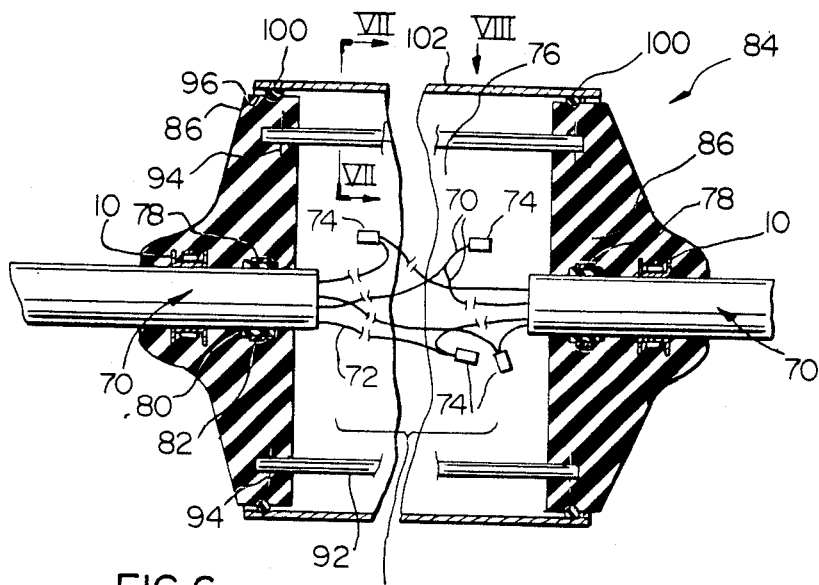
FIG. 6 is a cross-sectional view through an arrangement according to a second embodiment.
Figure 7:
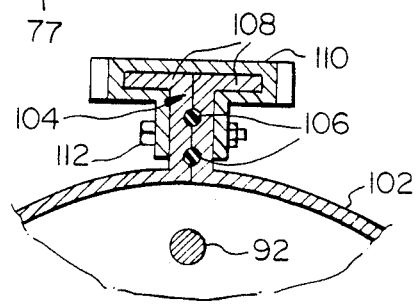
FIG. 7 is a cross-sectional view along line VII—VII in FIG. 6 and on a larger scale.
Figure 8:
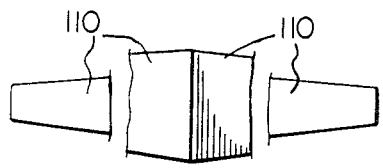
FIG. 8 is a view of the second embodiment in the direction of arrow VIII in FIG. 6.

A second embodiment according to the invention is shown by FIGS. 6, 7 and 8.

As shown by FIG. 6, two cable end sections 70 have their conductors 72 connected together to form splices 74 by extending across the region 76, which is devoid of jacket and sheath material between the cable ends. With the construction of this embodiment, as will be described, the splices 74 do not require to be sealed from the ambient atmosphere to protect them as the cables 70 are gas pressurisable cables for connection to a gas pressurisable source in conventional fashion. Hence atmospheric air conditions cannot contact the splices themselves. The splices do, however, need insulating from each other.

Thus, because of the gas pressurisable conditions, it is necessary for a combined splice closure and tensile strength means of the arrangement to be sealed against loss of pressure.

Each cable is surrounded by a strap member 10 which is secured in position in the manner described in the first embodiment. Each cable also has a seal 78 similar to seal 38 of the first embodiment. The seal 78 has an inner wrapping layer 80 of ethylene-propylene rubber and an outer layer 82 of resilient tape material as in the first embodiment.

Figure 9:
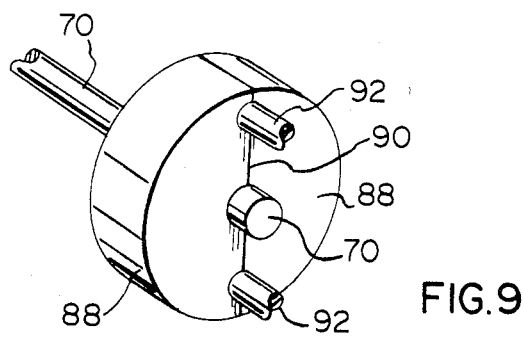
FIG. 9 is an isometric view showing the moulding of a plastic end in the second embodiment.

A combined closure and tensile strength means 84 is then provided. This combined means 84 comprises two individually moulded plastic ends 86 disposed one around each of the cable sections 70. As shown by FIG. 9, each plastic end 86 is individually moulded by use of a mould having two mould halves 88 which are joined along the diametral line 90 so as to be removable from around cable section 70. To mould the individual plastic ends, two moulds are used simultaneously and another part of the combined means 84 is incorporated during the moulding operation. This part comprises two tensile strength members in the form of steel rods 92 which are diametrically spaced apart one on each side of the cable sections 70, as shown by FIGS. 6 and 9. The steel bars extend through prepared holes in each of the moulds and into each of the mould cavities. Each end of each bar 92 either has a radially extending pin 94 passing through it or has an extremely roughened surface to ensure that it is gripped tightly by the plastic ends after the moulding operation. The two plastic ends are then moulded. Moulding may be performed by the use of an accumulator such as is described in the first embodiment, for moulding the total encapsulation in that case. The ends of the bars 92 are thus firmly secured within the plastic ends 86 so as to ensure that tensile loads such as are produced by the weight of aerial cable do not cause the plastic ends to pull apart but firmly hold them together.

As may be seen from FIG. 6, the peripheral surface 96 of each of the plastic ends is formed with an annular groove within which is disposed a compressible plastic seal 100. To completely enclose the region between the plastic ends, a shroud means 102 is provided to extend between the plastic ends so as to enclose the spliced together conductors and seal upon the seals 100. Conveniently the shroud means is formed from flexible sheet material such as steel which is wrapped around the two plastic ends to form a sleeve. Side edges of the sheet which meet during sleeve formation are bent to form a "U"-shape 104 and the bases of the two "U"-shapes hold between them axially extending seals 106 for fluid tightly sealing the confronting edges of the sheet together. To hold the edges sealed together, arms 108 of each "U"-shape increase in length from each end of the sleeve towards the center and metal locking devices 110 are provided of "C"-shaped cross-section (see FIG. 7) and also of tapering shape as shown in FIG. 8. Each device 110 conforms to the shape of the opposing arms 108 and is mounted upon the side edges 104 from an end of the sleeve, as shown by FIG. 7, so as to interlock with the "U"-shaped configuration. The locking devices force the edges 104 together so that they seal upon the seals 106. Securing pins 112 are then inserted through aligned holes through the locking devices 110 and the "U"-shaped ends 104 to hold the assembly together. The region 76 between the cable sections and the spliced together conductors is then sealed from ambient atmosphere and also a substantial seal is provided to prevent pressurised gases from escaping from within the arrangement.

In use, the second embodiment has advantages similar to those of the first embodiment. When a tensile load is placed upon the cable sections, this load is taken through the strap members 10, as described in the first embodiment, and into the plastic ends 86. This load is then transferred from end-to-end through the tensile strength members 92, which, as described, are securely mounted into the plastic ends to prevent relative movement.

What is claimed is:

1. A cable splice and closure arrangement in which conductors span a region between two cable sections of cables both having a jacket and sheath, said region being devoid of a cable jacket and metallic sheath, the arrangement provided with a combined closure and tensile strength means and with two strain relief devices, one encircling each cable section, each strain relief device comprising:

a strap member having radially inwardly extending piercing means which protrude through the jacket and into the sheath at circumferentially spaced positions around the cable, and radially outward projecting means; and wherein the combined closure and tensile strength means includes:

moulded plastic ends which intimately surround end portions of the cable sections with the projecting means intimately embedded in the plastic ends to transfer tensile load from the cable sections into the plastic ends; and bridging means extending between the plastic ends to enclose spliced together conductors in the arrangement and to carry tensile loads from one plastic end to the other.

2. An arrangement according to claim 1 wherein each strap member has a base having a certain width laterally of the strap member and with piercing means pressed in one direction from the base.

3. An arrangement according to claim 2 wherein the projecting means comprise flange means extending from edges of the base in the other direction.

4. An arrangement according to claim 2 wherein each strap member is held to the cable by a clamp having a flexible strip encircling the base and a screw thread means for tightening the strip around the base to force it onto the cable.

5. An arrangement according to claim 1 wherein the bridging means is a moulded axially extending part of the closure which extends between and is integrally moulded with the plastic ends, said axially extending part also provided to carry tensile loads from one plastic end to the other.

6. An arrangement according to claim 1 wherien the bridging means comprises a shroud means which extends between the plastic ends and is sealed thereto to enclose the spliced together conductors, the bridging means also comprising a plurality of tensile strength members which are spaced apart circumferentially of the arrangement, extend axially and are secured to the plastic ends.

7. An arrangement according to claim 6 wherein the shroud means comprises a flexible sheet material wrapped around the devoid region to form a sleeve which is sealingly mounted around the plastic ends.

8. A method of making a cable splice and closure arrangement comprising:

providing two sections of cables both having a jacket and sheath, the sections spaced by a cable region which is devoid of a cable jacket and metallic sheath and with conductors extending from at least one of the sections, spliced to other conductors;

locating a strain relief in the form of a strap member around each cable section with piercing means of the device protruding through the cable jacket and into the sheath and with projecting means extending outwardly from the jacket; and providing a combined splice closure and tensile strength means by moulding plastic ends of the closure and tensile strength means, with one plastic end surrounding and in intimate engagement with each cable section to intimately embed the projecting means in the plastic end, and bridging between the plastic ends to enclose spliced together conductors in the arrangement and to carry tensile loads from one plastic end to the other.

9. A method according to claim 8 comprising bridging between the plastic ends by moulding an axially extending part of the closure integrally with and extending between the plastic ends, the axially extending part also provided to carry the tensile loads.

10. A method according to claim 8 comprising bridging between the plastic ends by providing a plurality of tensile strength members in spaced-apart positions circumferentially of the arrangement and extending axially to the position of the plastic ends, then moulding the plastic ends while securing the strength members to the plastic ends, and bridging between the plastic ends by disposing a shroud means between the plastic ends and sealing the shroud means to the plastic ends to enclose the spliced together conductors.

11. A method according to claim 10 wherein the tensile strength members have parts which are embedded into the plastic ends as the ends are being moulded.

* * * * *